US011257649B2

(12) United States Patent
Packard

(10) Patent No.: US 11,257,649 B2
(45) Date of Patent: Feb. 22, 2022

(54) VOLTAGE PROTECTIVE DEVICE HAVING A RESETTABLE CIRCUIT INTERRUPTER THAT IS TRIPPABLE IN AN OVERVOLTAGE CONDITION

(71) Applicant: Pass & Seymour, Inc., Syracuse, NY (US)

(72) Inventor: Thomas N. Packard, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 167 days.

(21) Appl. No.: 16/520,991

(22) Filed: Jul. 24, 2019

(65) Prior Publication Data

US 2020/0035436 A1      Jan. 30, 2020

Related U.S. Application Data

(60) Provisional application No. 62/702,941, filed on Jul. 25, 2018.

(51) Int. Cl.
| | |
|---|---|
| *H01H 83/04* | (2006.01) |
| *H02H 1/00* | (2006.01) |
| *H02H 3/08* | (2006.01) |
| *H02H 3/20* | (2006.01) |
| *H01H 1/02* | (2006.01) |
| *H01H 71/02* | (2006.01) |

(52) U.S. Cl.
CPC ............ *H01H 83/04* (2013.01); *H01H 71/02* (2013.01); *H02H 1/0015* (2013.01); *H02H 3/08* (2013.01); *H02H 3/20* (2013.01)

(58) Field of Classification Search
CPC .. H01H 2083/201; H01H 13/14; H01H 71/02; H01H 71/123; H01H 71/128; H01H 83/04; H01H 83/12; G01R 31/3277; G01R 31/52; G01R 31/54; G05F 1/571; H01R 13/7135; H01R 24/78; H01R 25/006; H02H 1/0015; H02H 3/08; H02H 3/105; H02H 3/16; H02H 3/162; H02H 3/20; H02H 3/335; H02H 5/105; H02H 9/00; H02H 9/04; H02H 9/046
See application file for complete search history.

(56) References Cited

U.S. PATENT DOCUMENTS

| | | |
|---|---|---|
| 6,040,967 A | 3/2000 | DiSalvo |
| 7,446,437 B2 | 11/2008 | Paik et al. |

(Continued)

*Primary Examiner* — Jared Fureman
*Assistant Examiner* — Nicolas Bellido
(74) *Attorney, Agent, or Firm* — Bond, Schoeneck & King, PLLC; Frederick Price

(57) ABSTRACT

A protective device including: a plurality of line terminals and a plurality of load terminals a circuit interrupter including a solenoid and a set of interrupting contacts that connect at least one line terminal and at least one load terminal in a reset state and disconnect the at least one line terminal and the at least one load terminal in a tripped state; a voltage detection element configured to detect voltage across the plurality of line terminals and generate a line voltage rejection signal when greater than a predetermined overvoltage; a reset assembly including a reset button and a reset switch operatively coupled to the reset button; and a reset prevention mechanism configured to prevent the circuit interrupter from entering the reset state when the reset signal is absent.

20 Claims, 14 Drawing Sheets

(56) References Cited

U.S. PATENT DOCUMENTS

| | | | | |
|---|---|---|---|---|
| 8,335,062 | B2* | 12/2012 | Haines | H02H 3/00 |
| | | | | 361/42 |
| 9,484,735 | B2 | 11/2016 | Weeks et al. | |
| 9,819,177 | B2* | 11/2017 | Du | H02H 11/002 |
| 9,876,344 | B2 | 1/2018 | Endozo et al. | |
| 9,948,087 | B2* | 4/2018 | Haines | G01R 31/54 |
| 10,020,649 | B2* | 7/2018 | Du | H02H 3/335 |
| 2003/0080837 | A1* | 5/2003 | Macbeth | H02H 3/05 |
| | | | | 335/18 |
| 2011/0216451 | A1* | 9/2011 | Haines | B60L 53/16 |
| | | | | 361/42 |
| 2011/0216453 | A1* | 9/2011 | Haines | H02H 9/00 |
| | | | | 361/49 |
| 2015/0333498 | A1* | 11/2015 | Weeks | G01R 31/52 |
| | | | | 361/42 |
| 2016/0211659 | A1* | 7/2016 | Weeks | H01H 71/50 |

* cited by examiner

VOLTAGE PROTECTIVE DEVICE HAVING A RESETTABLE CIRCUIT INTERRUPTER THAT IS TRIPPABLE IN AN OVERVOLTAGE CONDITION

CROSS-REFERENCE TO RELATED APPLICATIONS

This application claims priority to U.S. Provisional Patent Application Ser. No. 62/702,941 filed Jul. 25, 2018, the entirety of which is incorporated herein by reference.

FIELD OF THE INVENTION

Technical Background

Residential and commercial electrical distribution systems serve to distribute power from a power source to a load by way of a panel box (load center) and branch circuits. The power source is bonded to a ground rod at the panel. Electrical wiring devices are installed in the branch circuits, e.g. receptacles, wireless coupling devices, wall switches, on-off switches, and dimmers, allowing users to connect the load to the power source. Electrical wiring devices are typically housed in outlet boxes. Circuit breakers are typically located inside the load center to protect branch circuits from overheating when the load current is greater than what the branch circuit conductors or the wiring devices are capable of handling. Circuit breakers are typically rated 15 or 20 Amperes. A main breaker protects the load center itself from becoming damaged by severe over-current conditions. Since they protect the electrical distribution system and loads from over-current, circuit breakers are a type of protective device.

Unfortunately, hazardous conditions are known to arise in the electrical power distribution system or the load resulting in fire, electrocution, personal injury, or property damage. By way of non-limiting example, these hazards are caused by frayed or missing insulation, loose or corroded electrical connections, and severed conductors. Since these hazardous conditions do not generate over-currents to trip the circuit breaker, other forms of protection that are more sensitive have found their way in the electrical distribution system. Ground fault circuit interrupters (GFCIs) interrupt current flowing through a person who contacts a live conductor at the same time as ground before there is an electrocution or serious burn. These devices typically operate at 6 mA whereas circuit breakers require at least 15 Amperes to operate. Arc fault circuit interrupters (AFCIs) interrupt the arcing condition before there is a risk of igniting nearby combustibles. Series arc faults occur across an electrical discontinuity in series with a load such as at a loose electrical terminal or inside a twist-on connector. Parallel arc faults are so named because they occur in parallel with the load, across hot (phase) and neutral or ground conductors where there is missing insulation. For either type of arc fault (series or parallel), the fault current is at such a low level the circuit breaker does not interrupt the fault quickly enough, if at all, to prevent the ignition of nearby combustibles.

Another known type of protective device is the transient voltage surge suppressor (TVSS), also known as a surge protective device (SPD). These devices suppress the momentary voltage surges that propagate on the electrical distribution system during lighting storms typically 4 kV, impulses less than a millisecond superimposed on the source voltage (e.g. 120 VAC). Surge suppression is accomplished using metal oxide varistors (MOV's) that are not designed to suppress sustained overvoltages, and in fact they can be damaged by prolonged overvoltages.

GFCI, AFCI and TVSS protection has been embedded in wiring devices (receptacles and switches serving as examples), circuit breakers and portable devices (multiple outlet strips, appliance plugs, extension cords, and adapters serving as examples). Portable adapters have an integral plug and receptacle.

Prolonged (or sustained) overvoltage conditions can occur in DC, single phase, two-phase (split phase) and three-phase electrical distribution systems. They can occur when there is a short circuit in a pole transformer in the case of AC, or an inverter in the case of DC. Those skilled in the art will recognize that for a 240 VAC split phase distribution system, a loss of the neutral conductor can result in an unbalanced voltage condition depending on the overall load impedances on the two phases, where one phase can approach 240 VAC while the other phase is approaching 0 VAC. Unfortunately an undervoltage condition can also be damaging, e.g. causing motors to stall and overheat.

Unfortunately, the protective devices (GFCIs, AFCIs, and TVSSs) as well as certain loads include sensitive electronics that can be damaged by sustained overvoltage. Various solutions to the problem have been attempted, but they have fallen short.

In one approach, sustained overvoltage is intended to cause a fuse to open to remove power, however that has not always proven reliable. Even if the fuse opens and the cause of the overvoltage condition corrected, there is the fuss and bother of having to replace the fuse.

In another approach, a sustained overvoltage causes a resettablez circuit interrupter to trip, removing power from the circuitry to be protected. Unfortunately, the overvoltage condition may not yet have been corrected at the time of attempting to reset the circuit interrupter. This re-exposes the protective device itself and the load to the potentially damaging condition each time reset is attempted.

What is needed is voltage protective device that has a resettable circuit interrupter that trips (opens) when there is an overvoltage (or undervoltage) condition and that will not close (reset) when the overvoltage condition is still detected. What is needed is a voltage protective device that can be combined with other protective features. What is needed is a voltage protective device that is compact and fits within the envelope of a circuit breaker, electrical wiring device or portable device.

Description of the Related Art Section Disclaimer: To the extent that specific patents/publications/products are discussed above in this Description of the Related Art Section or elsewhere in this disclosure, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

SUMMARY OF THE INVENTION

Embodiments of the present invention are directed to a protective device for use in an electrical voltage distribution system providing voltage from a power source to a load. According to one aspect, the protective device includes, but is not limited to a housing having a user accessible surface; a plurality of line terminals configured to electrically connect to the power source and a plurality of load terminals configured to electrically connect to the load; a circuit interrupter including a solenoid and a set of interrupting contacts that connect at least one line terminal and at least one load terminal in a reset state and disconnect the at least one line terminal and the at least one load terminal in a tripped state, the solenoid driving the interrupting contacts from the reset state to the tripped state when activated by a switching device; a voltage detection element configured to detect voltage across the plurality of line terminals and generate a line voltage rejection signal when greater than a predetermined overvoltage; a reset assembly including a reset button available via the user accessible surface and a reset switch operatively coupled to the reset button, the reset switch when operated causing a reset signal to be generated when the line voltage rejection signal is absent but not when the line voltage rejection signal is present; and a reset prevention mechanism configured to prevent the circuit interrupter from entering the reset state when the reset signal is absent.

DETAILED DESCRIPTION

Figure 1A:
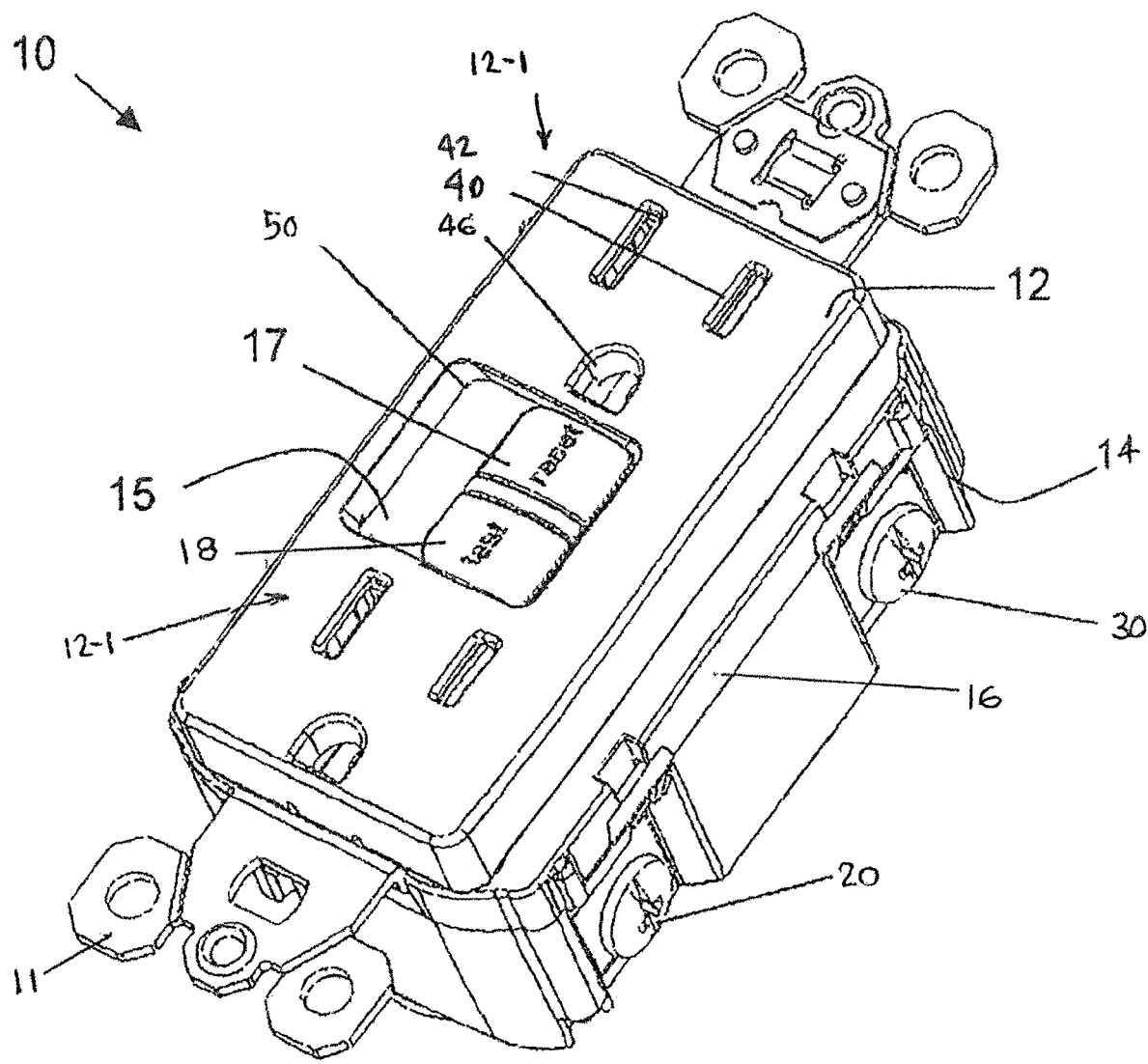
FIGS. 1A,B are front isometric views of a voltage protective device in accordance with an embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the protective electrical device of the present invention is shown in FIG. 1, and is designated generally throughout by reference numeral 10.

Figure 1B:
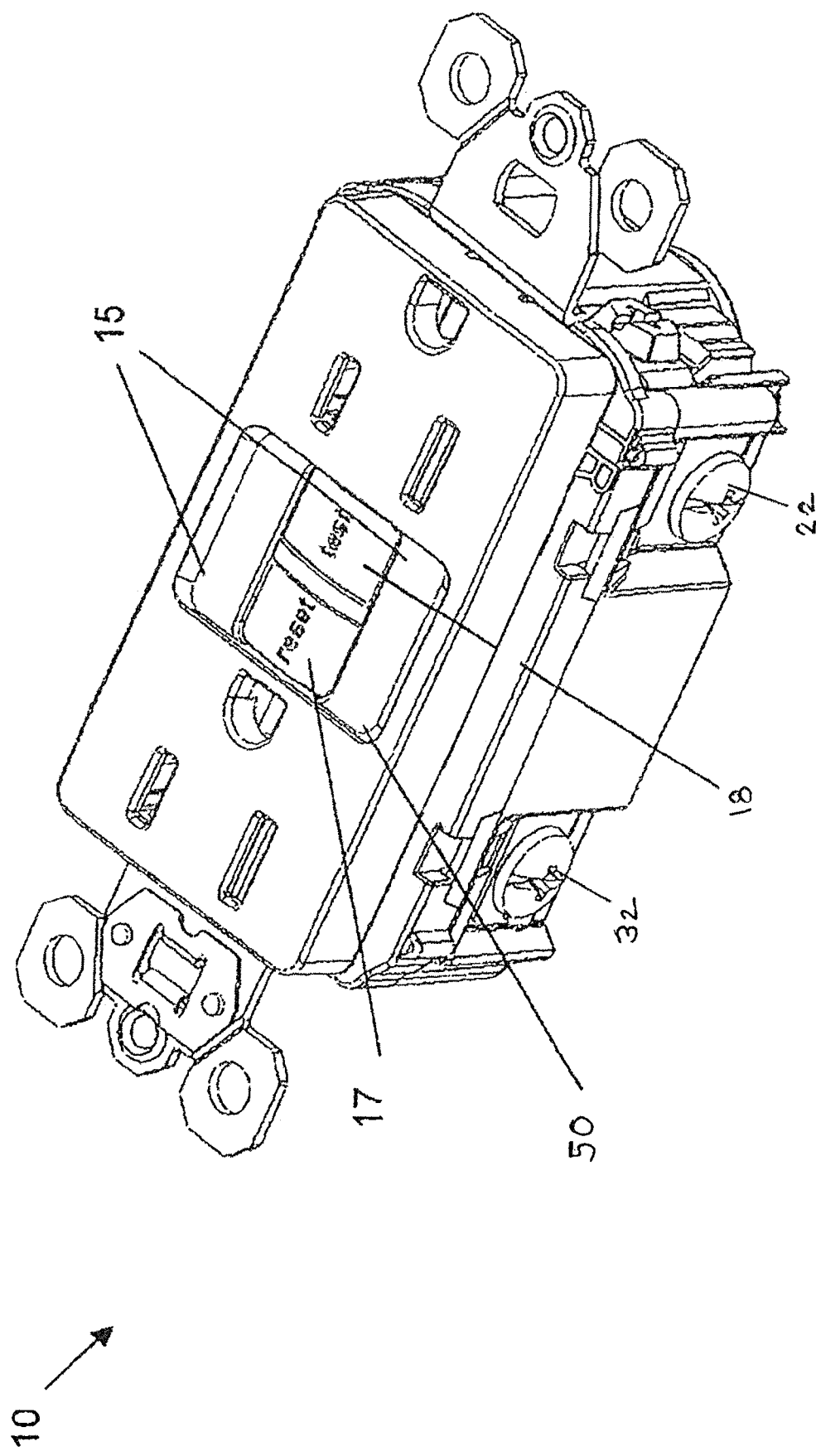

As embodied herein, and depicted in FIGS. 1A-1B, perspective views of the voltage protective device representing various wiring device embodiments of the present invention are disclosed. Voltage protective wiring device 10 includes a housing having a front cover 12, a back body member 14 and a separator 16. Device 10 mounts to an outlet box (not shown) by way of mounting ears 11. In these embodiments, only a small portion of the separator 16 can be viewed from the exterior of the device 10. The back body portion 14 includes line hot terminal 20 and line neutral terminal 22 that allow the device to be connected to a source of AC power and a set of feed-through load terminals that includes feed-through hot terminal 30 and feed-through neutral terminal 32 that allow the device to be connected to downstream receptacles in the branch circuit. A load may be plugged into downstream receptacles or receptacle openings 12-1 in front cover 12. When inserted in openings 12-1, the plug blades mate with a set of receptacle-load terminals including user load hot terminal 40, user load neutral terminal 42, and ground terminal 46.

As shown herein, the present invention provides the user with various kinds of indicators that may be included with the invention. FIG. 1A, e.g., shows an asymmetric recessed portion in the front cover that includes a recessed planar surface 15 that can accommodate human-readable indicia and one or more indicator lights 50. The indicator lights may be configured as an abnormal voltage indication, a trip indicator, a pilot light, a miswire indicator or an end-of-life indicator. The human-readable indicia, therefore, may provide a message or an instruction appropriate for the light(s). For example, if the light is a trip indicator, the message may read "press reset button if illuminated." A reset button 17 and a test button 18 are disposed adjacent to the recessed planar region 15.

Figure 2:
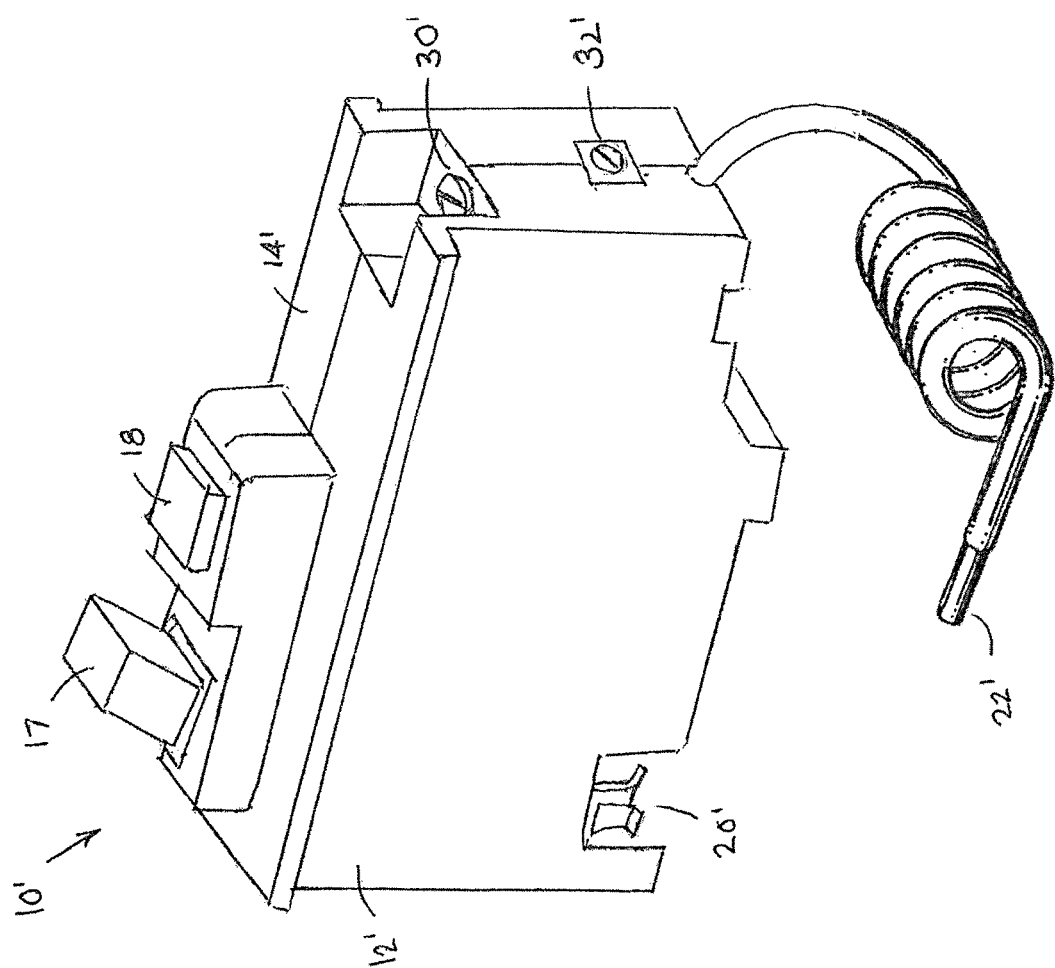
FIG. 2 is a front isometric view of a voltage protective device in accordance with another embodiment of the present invention.

As embodied herein and depicted in FIG. 2 a perspective view of the voltage protective device in accordance with various circuit breaker embodiments of the invention is disclosed. Voltage protective circuit breaker 10' includes a housing including left and right-side mating portions 12',14'. Side portions 12',14' include line hot terminal 20', line neutral terminal 22', load hot terminal 30' and load neutral terminal 32'.

The voltage protective device may be housed in an attachment plug, an extension cord, or a portable device (not shown).

Figure 3:
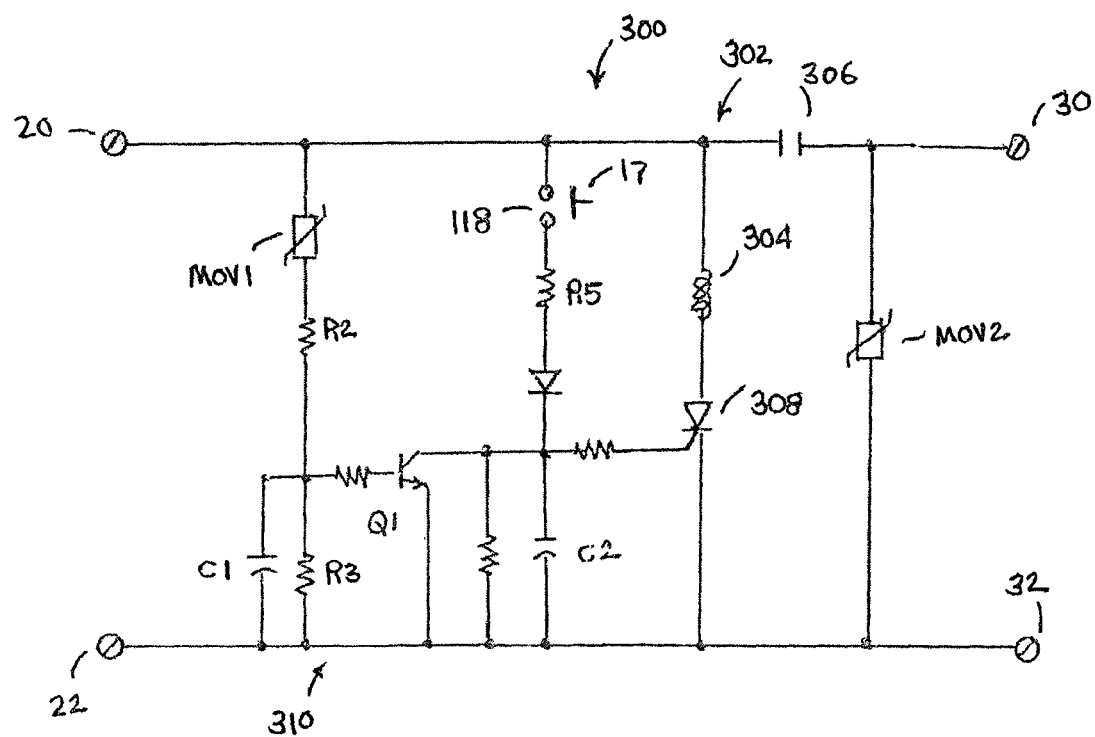
FIG. 3 is a detailed circuit diagram of a voltage protection circuit in accordance with an embodiment of the present invention.

As embodied and depicted in FIG. 3, a schematic diagram of a voltage protective device 300 is depicted. Device 300 includes an overvoltage detector 310 that operates as follows: When the source voltage on line terminals 20, 22 is less than the breakover voltage of MOV1, MOV1 does not conduct current so transistor Q1 is OFF; when the voltage on line terminals 20, 22 is greater than the breakover voltage of MOV1, transistor Q1 is ON. When reset button 17 is depressed, reset switch 118 closes. When Q1 is OFF and switch 118 closed, the resulting current flow through switch 118 causes the voltage on capacitor C2 to rise due to the R5C2 time constant. After at least one line cycle, the voltage on C2 rises until reaching the SCR 308 gate trigger voltage. SCR 308 turns ON, causing solenoid 304 of circuit interrupter 302 to energize. As will be described, the energizing of solenoid 304 removes a mechanical barrier to allow circuit interrupter 302 to reset interrupting contact 306. In other words, in some embodiments, when the reset button 17 is pressed, the solenoid 108 can fire, impacting latch 102, allowing the reset pin 104 to penetrate the latch 102 further resulting in resetting the device. Latch 102 can be the mechanical barrier.

When the overvoltage is just slightly above the threshold, Q1 is ON only at the crest of the AC power source. Although Q1 is ON only briefly, C2 is still dump-discharged to at or near 0 Volts by Q1. Even with the passage of multiple line cycles, Q1 prevents C2 from charging to the gate trigger voltage. In other words, no matter how long reset button 17 is depressed, SCR 308 will not turn ON, solenoid 304 will not energize, and the mechanical barrier will not be removed. As will be described, the mechanical barrier prevents the closure of interrupting contacts 306 and the occurrence of power on load terminals 30, 32 for even for a split second. Capacitor C1 serves as a noise filter, eliminating false turn-on of Q1 when there is high frequency noise on the electrical distribution system.

Figure 4:
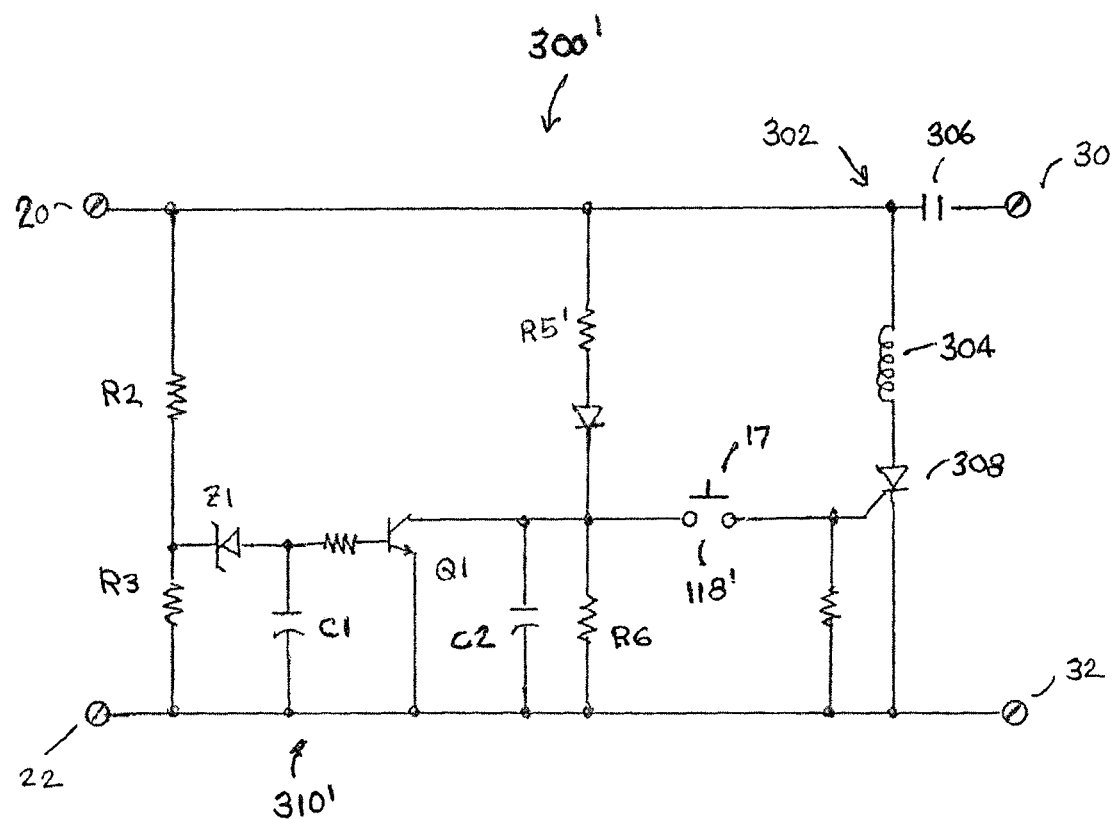
FIG. 4 is a detailed circuit diagram of a voltage protection circuit in accordance with an embodiment of the present invention.

As embodied and depicted in FIG. 4, a schematic diagram of a voltage protective device 300' is depicted. Device 300' is similar to device 300 shown in FIG. 3 except that an overvoltage detector 310 includes Zener diode Z1. When there is an overvoltage condition, diode Z1 forward biases to turn on Q1. Q1 suppresses voltage on capacitor C2 as before, however, when Q1 is OFF, capacitor C2 is being charged by current through resistor R5' even when reset button 17 is not being depressed. When open, reset switch 118' decouples capacitor C2 from SCR 308.

Figure 5:
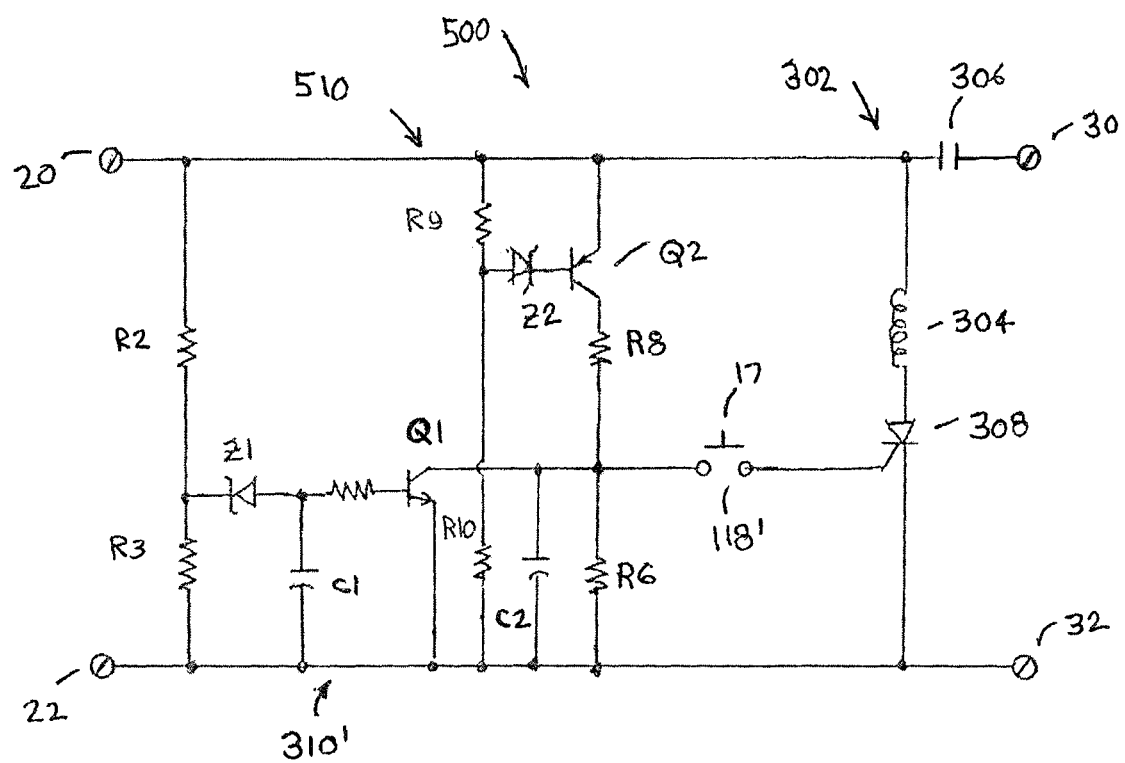
FIG. 5 is a detailed circuit diagram of a voltage protection circuit in accordance with an embodiment of the present invention.

As embodied and depicted in FIG. 5, a schematic diagram of a voltage protective device 500 is depicted. Device 500 is similar to device 300' shown in FIG. 4, however resistor R5' is replaced by an undervoltage detector 510. Whereas resistor R5' provided charging current to C2 during an undervoltage condition, undervoltage detector 510 does not. When the line voltage is less than a predetermined undervoltage, Zener diode Z2 is non-conductive and transistor Q2 is OFF. Obviously Q1 is also OFF since it only turns on when there is overvoltage, as has been described. Even though Q1 is OFF, there is no voltage on capacitor C2 since Q2 is OFF. When reset button 17 is depressed to close reset switch 118', there is no voltage on C2 to trigger SCR 308 into conduction. Solenoid 304 will not be energized and the mechanical barrier will not be removed. The interrupting mechanism will not reset, not even for a split second.

When the line voltage at terminals 20, 22 is just above the predetermined undervoltage, diode Z2 starts to conduct and turn Q2 ON, only at the crest of the AC power source. Even though Q2 is ON only briefly, C2 starts to charge. Since Q1 does not turn on to dump discharge C2, the voltage on C2 is able to reach the gate trigger voltage of SCR 308. Now when reset button 17 is depressed and reset switch 118' closes, SCR 308 will turn ON energizing solenoid 304, and the mechanical barrier will be removed. As has been described, device 500 will reset when the line voltage (the voltage between terminals 20, 22) is between the predetermined undervoltage and overvoltage limits, but not outside these limits. As should be appreciated by a person of skill in the art in conjunction with a review of this disclosure, an acceptable UL voltage range can be between 102 VAC and 132 VAC. As such, an undervoltage can be defined by a voltage occurring below the acceptable UL range and an overvoltage can be defined as a voltage occurring above the acceptable UL range. In one embodiment of the invention, the undervoltage limit is 80 VAC and the overvoltage limit is 150 VAC.

Figure 6:
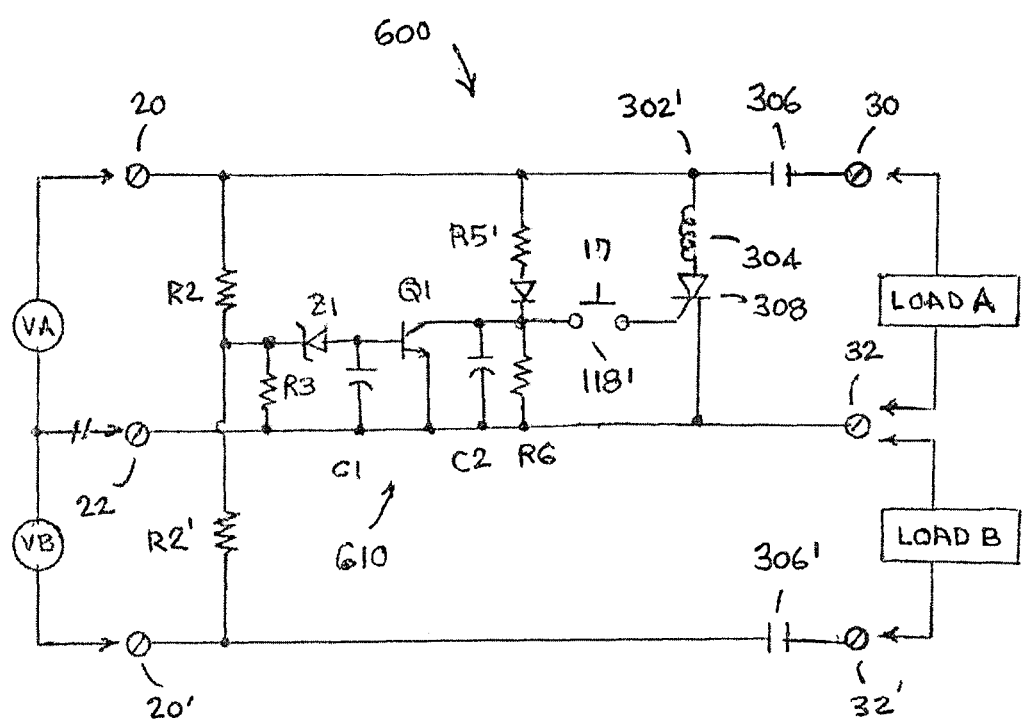
FIG. 6 is a block diagram of a voltage protection circuit combined with an AFCI or GFCI protective feature in accordance with an embodiment of the present invention.

As embodied and depicted in FIG. 6, a schematic diagram of a voltage protective device 600 is depicted. Device 600 is similar to device 300' shown in FIG. 4 except configured for a two phase (split phase installation) where both source voltages (VA, VB) are available to the device. Voltage sources (VA,VB) provide approximately the same voltage at terminals 20,20' with respect to terminal 22 however these two voltages are opposite in phase. When interrupter contacts 306,306' are closed in the reset state, device 600 connects voltage source VA to load A and voltage source VB to load B. Voltage detector 610 includes resistors R2,R2' that sum the two voltages. Since the sum of voltages VA,VB is less than the breakover voltage of Zener diode Z1 (the voltage sum is ideally 0 Volts), transistor Q1 is OFF. Capacitor C2 is charged by current flow through R5'. When reset button 17 is depressed, the voltage on capacitor C2 provides a gate trigger signal to turn SCR 308 ON. This energizes solenoid 304 which removes a mechanical barrier to allow circuit interrupter 302' to reset.

However, when the neutral conductor connected to terminal 22 is open or missing, there will be a mismatch in voltages across load A and across load B depending on the impedances of the two loads. For example, if the impedance of load B is much less than the impedance of load A, then an undervoltage will exist across load B (and thus line terminals 20', 22) and an overvoltage will exist across load A (and thus line terminals 20, 22). If the voltage summed by resistors R2,R2' is greater than the breakdown voltage of diode Z1, Q1 turns ON. Q1 dumps discharge capacitor C2. Now when reset button 17 is depressed, the voltage on capacitor is insufficient to provide a gate trigger signal. SCR 308 stays OFF and solenoid 304 does not energize to remove the mechanical barrier. Circuit interrupter 302' cannot be reset.

Figure 7:
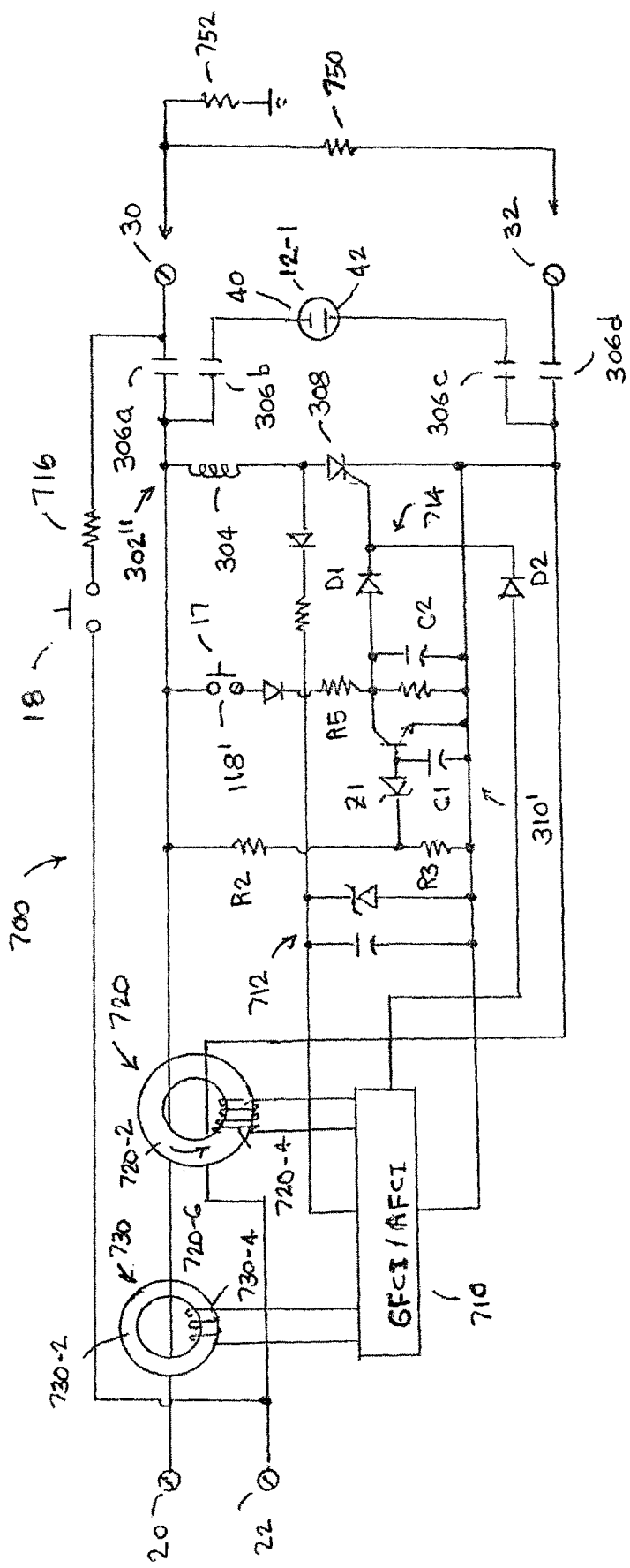
FIG. 7 is a block diagram of a voltage protection circuit combined with an AFCI or GFCI protective feature in accordance with an embodiment of the present invention.

As embodied and depicted in FIG. 7, a schematic diagram of a voltage protective receptacle 700 having a GFCI/AFCI protective feature is depicted. Operation of the overvoltage detector 310' has been described in FIG. 4. Absent an overvoltage condition, when reset button 17 is depressed and reset switch 118' closes, capacitor C2 keeps charging by current through resistor R5 until the voltage on C2 provides a gate trigger signal through diode D1 of OR gate 714, turning SCR 308 ON. This energizes solenoid 304 which removes a mechanical barrier to allow circuit interrupter 302" to reset. Circuit interrupter 302" has four sets of interrupting contacts 306a, 306b, 306c, 306d for connecting line terminals 20, 22 to respective load terminals 30, 32, 40, 42 in the reset state. In the tripped state, the interrupting contacts 306a, 306b, 306c, 306d disconnect the load terminals from the line terminals and also isolate receptacle load terminals 40, 42 from respective feed-through load terminals 30, 32. When an overvoltage condition is present, Q1 turns on and dump discharges capacitor C2, so C2 never charges to the voltage necessary to turn SCR 308 ON. Solenoid 304 is not energized to remove the mechanical barrier, so circuit interrupter 302' cannot be reset.

Voltage protective receptacle 700 includes a set of sensors for sensing an electrical fault condition in the electrical distribution system. Among them are a differential current transformer 720 and current transformer 730 for respectively sensing ground fault and arc fault conditions. Transformer 720 includes a toroidal core 720-2 that is made of a ferrite, ring laminate, or magnetic material. The line and neutral conductors pass through the opening of toroidal core 720-2, each constituting a single turn primary winding. Ordinarily the currents on the line and neutral conductors to and from the load 750 are equal and opposite (the vectorial sum of the two currents is zero). Thus the magnetic fields induced by the two primary windings in core 720-2 cancel each other, so there is little or no magnetic flux circulating in core 720-2 and consequently little or no signal induced on secondary winding 720-4. When ground fault 752 is present, the fault current will flow on the line conductor but some or even all will return on the nearby ground conductor or a spurious ground path instead of on the neutral conductor, causing a net flux 720-6 in core 720-2 and a resulting signal on secondary winding 720-4. Secondary winding 720-4 is connected to detector 710 which analyses the signal, generating the fault detection signal when predetermined criteria are met. Detector 710 is connected to power supply 712 and may include a processor, micro-controller, or discrete components.

Current transformer 730 is inductively coupled to the line conductor passing through device 10, or in an alternate embodiment of the invention (not shown), to the neutral conductive path through device 10, or both. Sensor 730 has a multi-turn secondary winding 730-4 wound on a core 730-2 made of plastic, a ferrite material, a non-magnetic material, or a magnetic material. The arc fault condition causes high frequency current components to flow on the phase (or neutral path). Due to the magnetic coupling, a derivative of that current (a di/dt signal) appears on secondary winding 730-4. Secondary winding 730-4 is connected to detector 710 which analyzes the di/dt components, generating the fault detection signal if the high frequency components meet predetermined criteria. In alternate embodiments of the invention (not shown), an arc fault signal is derived from a shunt sensor or a line voltage sensor. When an arc fault or a ground fault condition is detected by detector 710, it provides a signal through diode D2 of OR gate 714 to turn SCR 308 ON. Solenoid 304 is energized. As will be described, solenoid 304 causes interrupter 306" to trip by releasing a mechanical latch. Protective receptacle 700 includes an electronic test button 18. When test button 18 is depressed, there is a current flow on the line (hot) conductor but not the neutral conductor passing through core 720-2. Thus the current through test button 18 simulates a ground fault condition, the amount of ground fault current being set by resistor R716. When transformer 720, detector 710, power supply 712, and circuit interrupter 302" are operational, reset button 17 will pop out, demonstrating that ground fault protection is being provided. If the reset button does not pop out, one or more component is at end of life and the receptacle needs to be replaced. Receptacle 700 may have other protective features: GFCI/AFCI detector 710 may include a checking function that checks the operation of the device automatically that prevents the circuit interrupter from resetting when there is an end of life condition. As another example, GFCI/AFCI detector 710 may include a miswire protection feature that prevents the circuit interrupter from resetting when the line conductors (the conductors from the voltage source) are misconnected to the feed-through load terminals 30,32. For a more complete description of example GFCIs, U.S. Pat. Nos. 9,819,177, and 10,020,649, are hereby incorporated by way of reference in its entirety.

Figure 8:
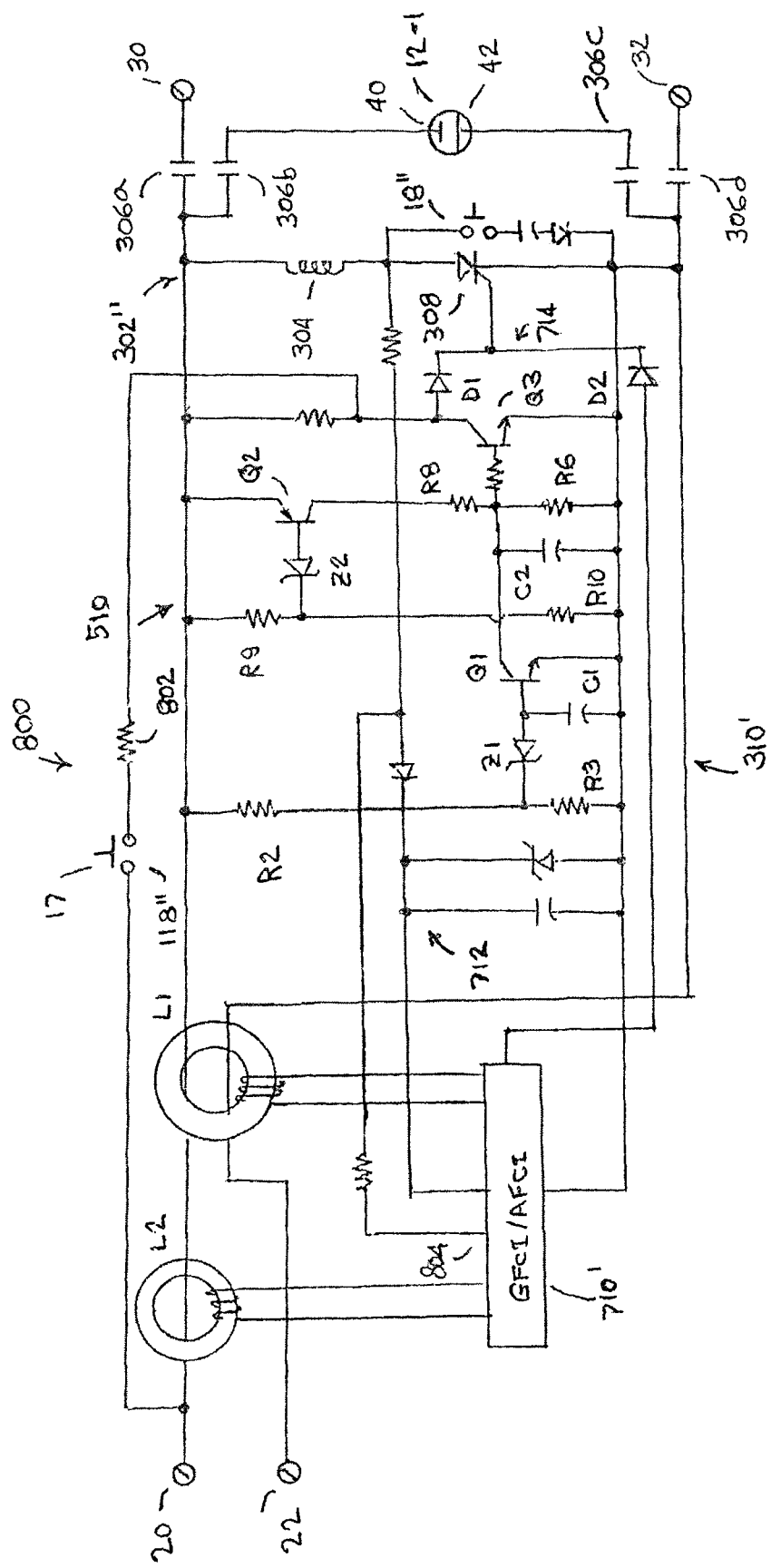
FIG. 8 is a block diagram of a voltage protection circuit combined with an AFCI or GFCI protective feature in accordance with another embodiment of the present invention.

As embodied and depicted in FIG. 8, a schematic diagram of a voltage protective receptacle 800 having a GFCI/AFCI protective feature is depicted. Receptacle 800 includes voltage protection similar to FIG. 5, including an overvoltage protector 310' and an undervoltage protector 510. One difference in the voltage protection circuit is the inclusion of transistor Q3. When line voltage is between the predetermined undervoltage and predetermined overvoltage limits, capacitor C2 charges as has been described, so Q3 is ON and its collector is LOW. When line voltage is below the predetermined undervoltage or above the predetermined overvoltage limits, capacitor C2 cannot charge to turn Q3 ON, so its collector is HIGH. Thus, when reset button 17 is depressed, current will flow through switch 118" only when Q3 is ON. In other words, there is current flow when the line voltage is between the predetermined undervoltage and overvoltage limits but not outside those limits. The current through switch 118" constitutes a simulated ground fault condition, the amount of simulated fault current being established by resistor 802. If transformer 720, power supply 712 and detector 710' are operational, detector 710' provides a signal through diode D2 of OR gate 714 to turn SCR 308 ON. Solenoid 304 energizes to remove a mechanical barrier to enable reset. However, if one or more of transformer 720, power supply 712, detector 710', SCR 308 or solenoid 304 are not operational and instead at end of life, solenoid 304 will not energize. The mechanical barrier will not be removed and the interrupter will not reset, even for a moment. In another embodiment of the invention, the GFCI is tested by closing a wire loop passing through the differential transformer 720 and a grounded neutral transformer (not shown) to simulate a grounded neutral condition.

Figure 9:
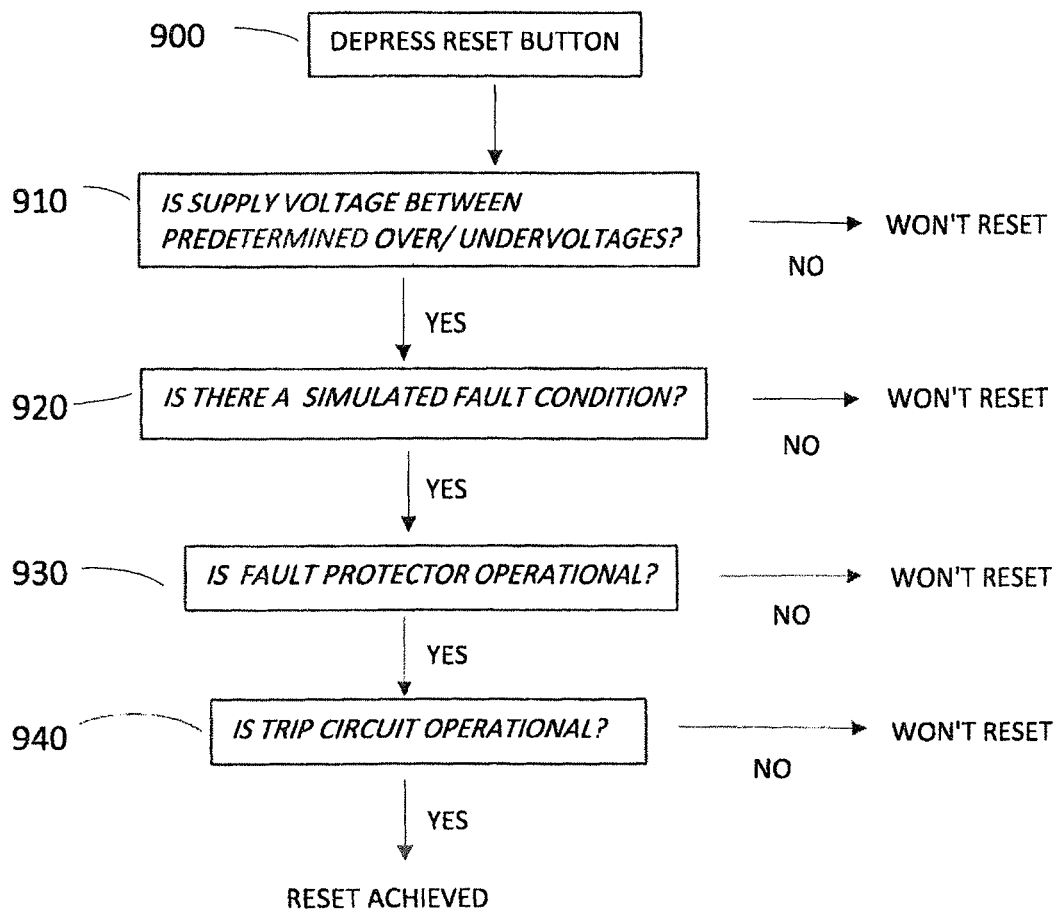
FIG. 9 is a flow chart diagram illustrating a test sequence in accordance with the embodiment depicted in FIG. 8.

FIG. 9 is a flow chart diagram that illustrates the test sequence for the embodiment of the invention depicted in FIG. 8. Reset button 17 is manually manipulated in step 900. This is followed by a set of steps (910, 920, 930, 940) that need to be met to achieve reset due to that manipulation: In step 910 the supply voltage has to be less than a predetermined overvoltage limit and less than a predetermined undervoltage limit. The supply voltage being inside these limits results in a test signal being generated in step 920 to test the operability of a protective device. The test signal may simulate a ground fault condition if the protective device is a GFCI, or an arcing condition if the protective device is an AFCI. For a combination AFCI/GFCI, there may be more than one test signal for testing each section of the protective device. The protective device being operational in step 930 results in detector 710' generating a test acceptance signal. The test acceptance signal is provided to the trip circuit including a switching device (e.g. an SCR) and a solenoid. If the trip circuit is operational in step 940, a mechanical barrier is removed to enable reset. If any of these steps are not met, the mechanical barrier is not removed and the circuit interrupter will not reset. In another embodiment of the invention, the same steps occur but in different order, e.g., the fault protector is tested first and if found acceptable, the supply voltage gets tested.

Test button 18 (in FIG. 7) causes the interrupter to trip when the device is operational, whereas reset button 17 (in FIG. 8) enables reset when the device is operational, both relying on electronic switches. Receptacle 800 includes a mechanical test button 18' that releases the latch in the trip mechanism of circuit interrupter 302" mechanically (see FIG. 15). In another embodiment of the invention, receptacle 800 includes an electronic test button 18" as shown in FIG. 7. In another embodiment of the invention, receptacle 800 includes an electronic trip button 18" that is able to trip the circuit interrupter (when manipulated) even when the fault protector is inoperative. Per FIG. 8, when you press 18", current will flow through 304, 18", the cap and diode, energizing 304. Instead of generating a simulated fault signal, trip button 18" bypasses the fault protector, tripping the interrupter directly. This may be desirable when the two buttons (18",17) are being used as on/off switches for controlling power to the load. Of course, the embodiments of FIGS. 7 and 8 are adaptable to a circuit breaker housing such as shown in FIG. 2. A single pole circuit breaker 306 or double pole breaker are used as appropriate.

It is also desirable that the voltage protective device not only not prevent the ability to even momentarily reclose the interrupting contacts when there is an overvoltage (or undervoltage) condition, but automatically trip when those conditions are detected. Input 804 of detector 710' monitors the amount of source voltage. When the source voltage is outside the predefined voltage limits, detector 710' signals diode D2 to trip the interrupter.

Figure 10:
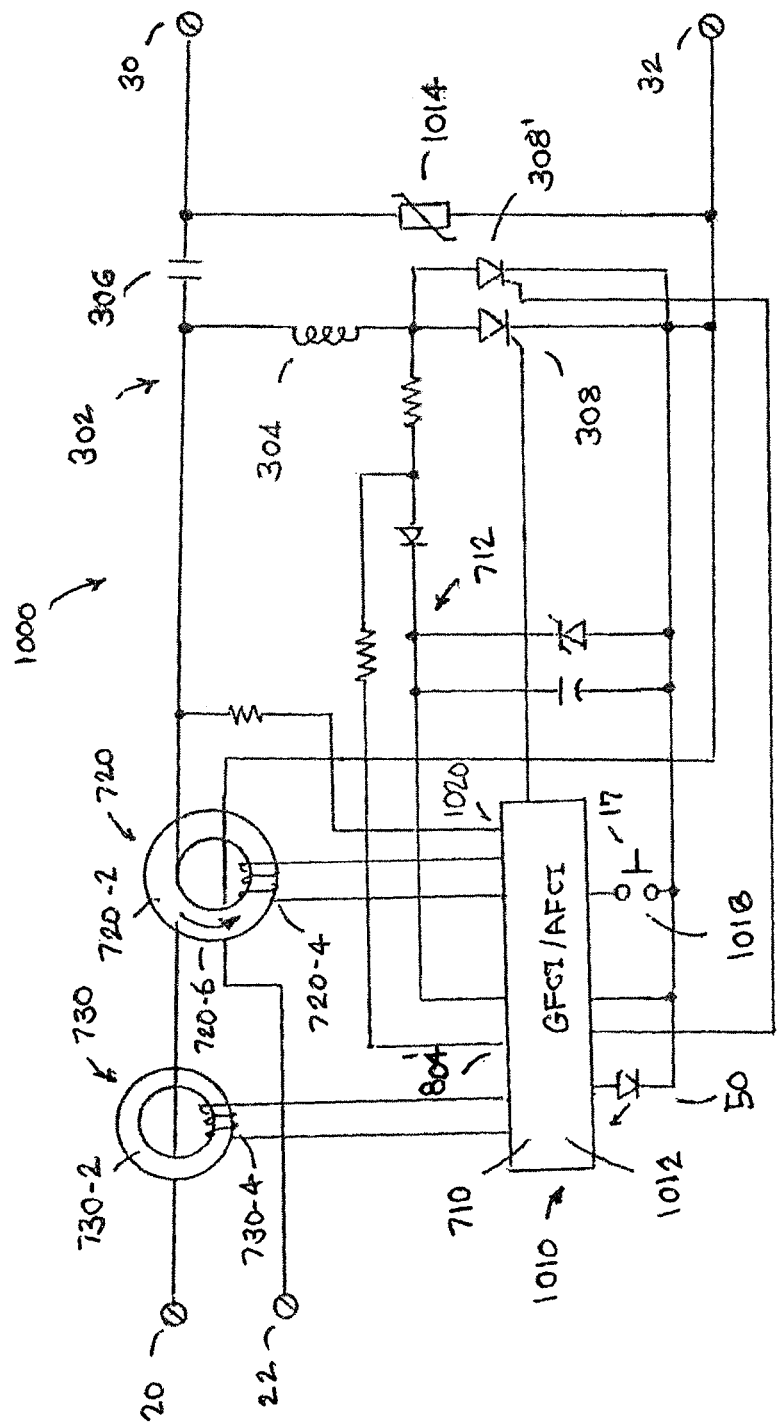
FIG. 10 is a block diagram of a of a voltage protective device combined with an AFCI or GFCI protective feature in accordance with another embodiment of the invention.

As embodied and depicted in FIG. 10, a schematic diagram of a voltage protective circuit breaker 1000 having a fault protective feature is depicted. Microcontroller 1010 executes the over-voltage and/or under-voltage protection function using firmware 1012 and thus does not require hardware for doing that, shown in other embodiments of the invention. When reset button 17 is depressed, reset switch 1018 provides a reset command signal to controller 1010, initiating a reset sequence similar to what has been described in FIG. 9. During step 910, source voltage monitor 804' is interrogated for an overvoltage or undervoltage condition. An undervoltage condition is when the source voltage has not attained the predetermined undervoltage limit at some point within at least a half cycle of the AC line frequency, and an overvoltage condition is when the source voltage is greater than the predetermined overvoltage limit at some point within at least a half cycle of the AC line frequency. If the source voltage lies inside the limits, controller 1010 initiates a series of test signals in step 920 for testing the fault protective feature. This may be accomplished by an output port 1020 that impresses a test signal on the hot conductor simulating a ground fault or arc fault to test various fault sensors or portions of controller 1010. If all of this passes, controller 1010 signals SCR 308 to turn ON. This energizes solenoid 308, removing a mechanical barrier to enable reset. If SCR 308 or solenoid 304 (the trip circuit) or the fault protector are not operational, or the source voltage is outside the predetermined limits, interrupter 302 will not reset. Voltage monitor 804' may continuously monitor the source voltage, controller 1010 tripping interrupter 302 when the source voltage lies outside the predetermined limits.

In an alternate embodiment of the invention, fault protector 710 is omitted from controller 1010. In other embodiments of the invention, voltage protector 1012 is programmed to respond to only overvoltage conditions or to only undervoltage conditions. In another embodiment of the invention, controller 1010 automatically provides a periodic test signal to test the operability of the fault protector function. Controller 1010 may be connected to SCR 308 (anode to cathode monitoring connection to controller 1010 is not shown). When controller 1010 detects that SCR 308 is experiencing an end of life condition, the controller uses a redundant SCR 308' to trip the interrupter. In another embodiment of the invention LED 50 indicates when circuit breaker 1000 has tripped and/or fails to reset, due to an overvoltage or undervoltage condition.

MOV 1014 protects sensitive circuitry in breaker 1000 from transient overvoltage conditions (lightning surges), however MOV 1014 is an example of a component in a protective device (whether in a circuit breaker, receptacle, or portable housing) that can be damaged due to sustained overvoltages. Since MOV 1014 is connected on the load side of interrupting contact(s) 306, the overvoltage protector removes power from it before a resulting damage.

As embodied herein and depicted in FIGS. 11-14, detail views of a reset lockout mechanism 100 for use in the various embodiments of the invention are disclosed. Directions of movement are depicted as arrows.

Figure 12:
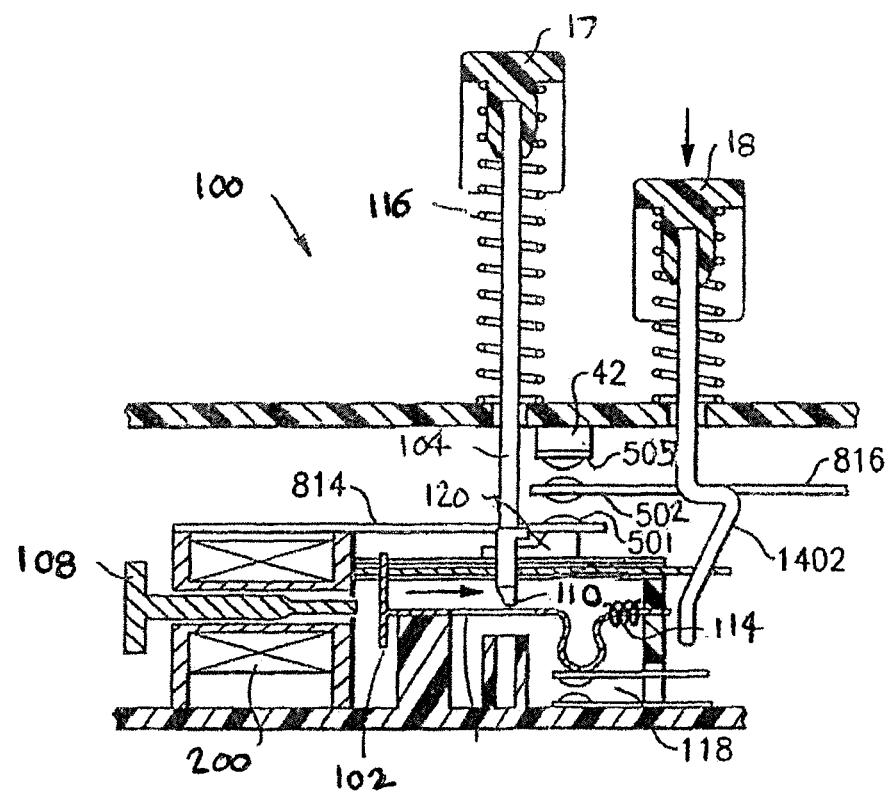
Figure 13:
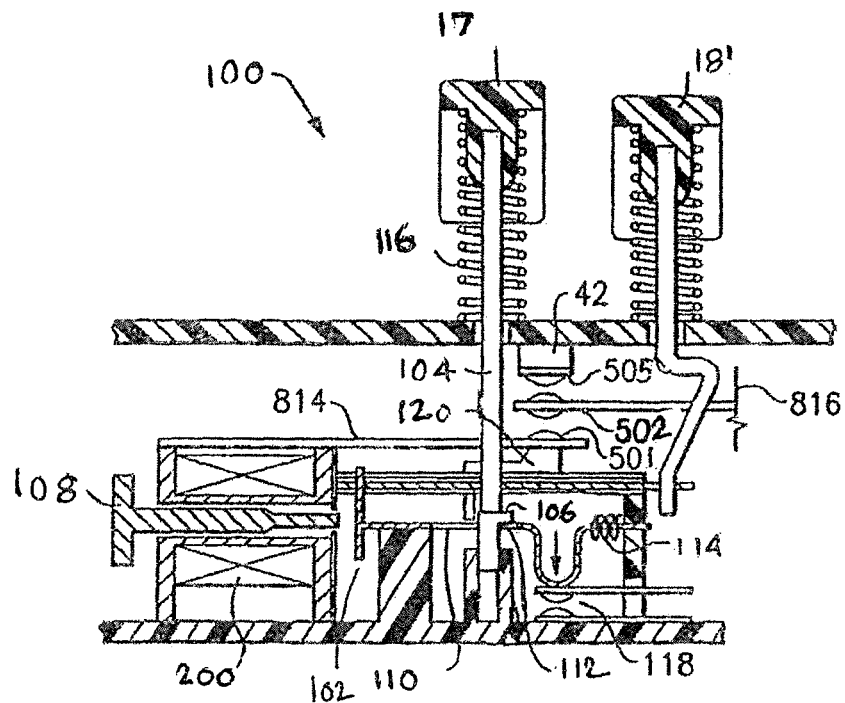

Referring to FIG. 12, mechanism 100 is in the tripped condition due to latch 102 not being coupled to escapement 106. To accomplish reset, a downward force is applied to reset button 17. Shoulder 112 on reset pin 104 bears downward on reset switch 118 to close the switch. As has been described, if closure of the switch does not result in a reset current being generated, reset does not happen: When the downward force is removed, the reset button simply moves upward under the biasing force of spring 116 and the interrupting contacts remain open. In other words, shoulder 112 acts like a reset barrier. On the other hand, if closure of the switch results in a reset current being generated, and assuming electronic circuitry is operational, solenoid 304 is energized to activate armature 108.

Figure 11:
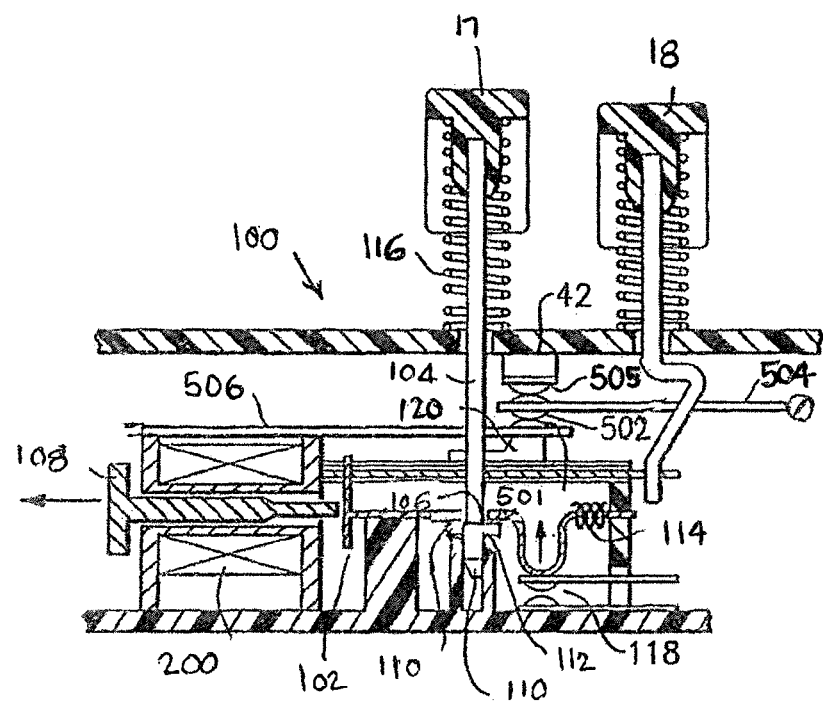
FIGS. 11-14 are detail views of a reset-lockout mechanism in accordance with the present invention.

The four sets of interrupting contacts (306a, 306b) may be accomplished in a variety of configurations. In FIG. 11, a sandwiched cantilever configuration is shown comprising cantilevers 501, 502 terminated respectively with single and double sided contacts. Since FIG. 12 depicts the tripped state, the contacts are shown being disconnected, also from stationary contact 505. A similar arrangement (not visible in this view) applies to interrupting contacts (306c, 306d).

Figure 14:
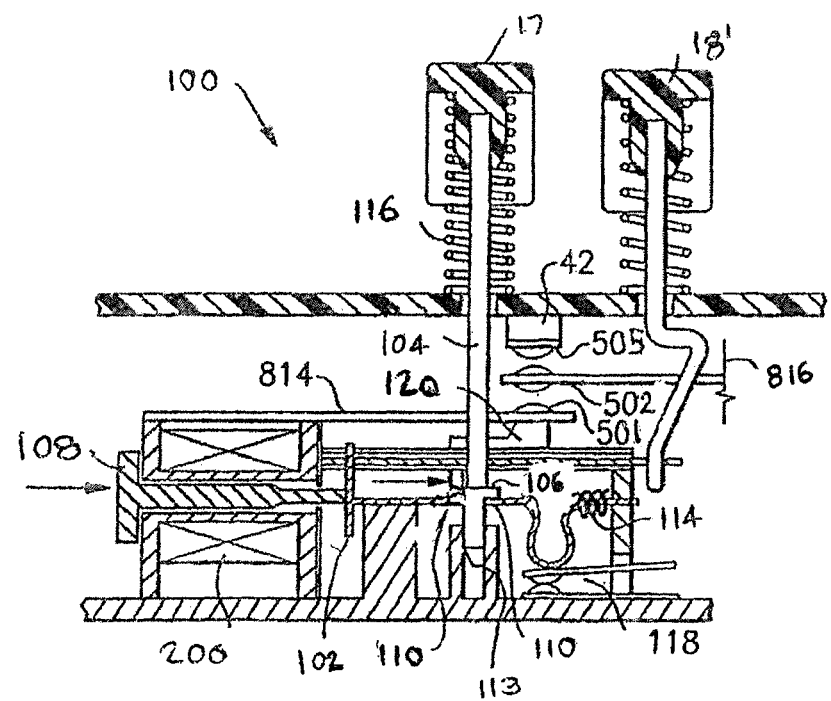

Referring to FIG. 14, the reset signal has been sensed and the circuitry is operational, resulting in solenoid 304 being energized to activate armature 108. Armature 108 moves in the direction shown.

Figure 15:
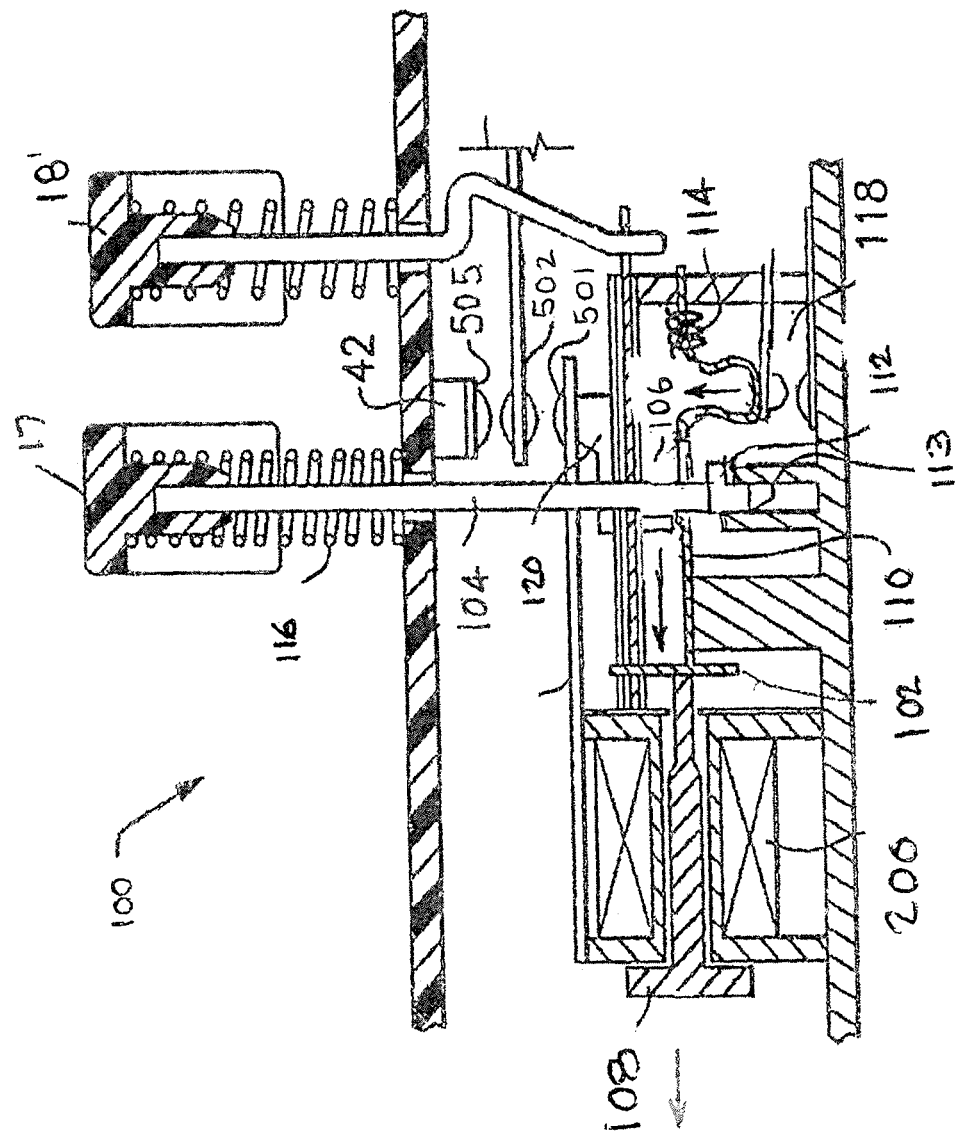
FIG. 15 is a detail view of a test mechanism in accordance with embodiments of the invention.

Referring to FIG. 15, armature 108 has moved latch 102, permitting hole 110 in latch 102 to become aligned with shoulder 112. The downward force applied to reset button 17 causes shoulder 112 to continue to move downward, since it is no longer restrained by latch 102. Since shoulder 112 is now disposed beneath latch 102, it is no longer able to apply a downward force on latch 102 to close reset switch 118. Accordingly, switch 118 opens to thereby terminate the activation of solenoid 304. When switch 118 opens, armature 108 moves in the direction shown in response to the biasing force of spring 114.

As depicted in FIG. 11, the trip mechanism is in a reset condition. In other words, the downward force being on reset button 17, as described above, has been removed. Accordingly, latch 102 is seated on latching escapement 106. Latching escapement 106 has moved latch 102 and a non-conductive latch block 120 upward in response to the biasing force of spring 116. Latch block 120 has moved cantilevers 501, 502 upward until the contact on cantilever 502 comes to rest on contact 505.

Referring to FIG. 15, a user accessible test button 18 is mechanically coupled to trip mechanism 100. When test button 18' in FIG. 15 is depressed, mechanism 100 is tripped by a mechanical linkage. In particular, when force is applied to test button 18', a mechanical linkage 1402 urges latch 102 in the direction shown in FIG. 12. Latch 102 opposes the biasing force of spring 114. In response, hole 110 in latch 102 becomes aligned with escapement 106. The trip mechanism is tripped because latch 102 is no longer restrained by escapement 106.

Thus shoulder 112 locks out the ability to reset the circuit interrupter until such time as the solenoid is activated to remove the lock-out condition. The solenoid will only activate when the line voltage is within a predetermined range of voltages.

The lockout mechanism disclosed in FIGS. 11-14 may be adapted to circuit breaker embodiments of the invention that includes overcurrent protection. Over-current protection may be provided by a bi-metal element that carries the load current and self-heats. When reaching a pre-determined temperature, the bi-metal element deflects enough to trip the breaker. Over-current protection may be provided by an instantaneous trip (magnetic trip) feature in which the load current passes through a coil, generating a magnetic field. The breaker trips when the magnetic field reaches a predetermined field strength. Similar to other embodiments of the invention, a circuit breaker embodiment has reset button, a barrier structure and a reset switch. However, the barrier element may be movably coupled to the reset button through a set of linkages that are unnecessary for the wiring device embodiment. For a more complete description of an example circuit breaker device that includes a reset lock-out mechanism, U.S. Pat. No. 6,717,782, which is hereby incorporated by way of reference in its entirety. For a more complete description of an example wiring device that includes a reset lockout mechanism, U.S. Pat. No. 9,362,077, which is hereby incorporated by way of reference in its entirety.

Other factors that could cause a lockout condition include environmental factors such as an unacceptable temperature, pressure, and/or moisture measurement range, as defined by regulating entities (such as UL). An embodiment of the present invention contemplates an environmental factor detection element that is configured to detect such unacceptable environmental factor ranges, and to cause the reset prevention mechanism to prevent the circuit interrupter from entering the reset state in a similar manner (mechanically, electrically, and/or via software/firmware programming) as discussed herein.

What is claimed is:

1. A protective device for use in an electrical voltage distribution system providing voltage from a power source to a load, the protective device comprising:
   a housing having a user accessible surface;
   a plurality of line terminals configured to electrically connect to the power source and a plurality of load terminals configured to electrically connect to the load;
   a circuit interrupter including a solenoid and a set of interrupting contacts that connect at least one line terminal and at least one load terminal in a reset state and disconnect the at least one line terminal and the at least one load terminal in a tripped state, the solenoid driving the set of interrupting contacts from the reset state to the tripped state when activated by a switching device;
   a voltage detection element configured to detect voltage across the plurality of line terminals and generate a line voltage rejection signal when greater than a predetermined overvoltage;
   a reset assembly including a reset button available via the user accessible surface and a reset switch operatively coupled to the reset button, the reset switch when operated causing a reset signal to be generated when the line voltage rejection signal is absent but not when the line voltage rejection signal is present; and
   a reset prevention mechanism configured to prevent the circuit interrupter from entering the reset state when the reset signal is absent.

2. The protective device of claim 1, wherein the housing is configured to install in an electrical panel or an outlet box.

3. The protective device of claim 1, wherein the voltage detection element is configured to generate the line voltage rejection signal when the voltage across the plurality of line terminals is less than a predetermined undervoltage.

4. The protective device of claim 3, further including a microcontroller, wherein the voltage detection element includes a set of software instructions executed by the microcontroller.

5. The protective device of claim 1, further including a microcontroller, wherein the voltage detection element includes a set of software instructions executed by the microcontroller.

6. The protective device of claim 1, further comprising a fault protector including at least one sensing element and a fault detector, the at least one sensing element being configured to sense at least one fault condition in the electrical distribution system, the fault detector providing a trip signal to the switching device to activate the solenoid when the at least one fault condition meets predetermined criteria.

7. The protective device of claim 6, wherein the reset switch when operated initiates a test signal that simulates the at least one fault condition, the fault detector providing the reset signal in response to the test signal when the fault protection element is not experiencing an end of life condition.

8. The protective device of claim 7, wherein the line voltage rejection signal prevents the test signal from occurring resulting in the reset signal being absent.

9. The protective device of claim 6, wherein the fault detector and the voltage detection element are executed in a set of software instructions by a microcontroller.

10. The protective device of claim 9, wherein the reset switch is connected to an input port of the microcontroller.

11. The protective device of claim 6, wherein the fault protector provides ground fault protection, arc fault protection, overcurrent protection or transient voltage protection.

12. The protective device of claim 1, further including a voltage monitoring element that provides a trip signal to the switching device to activate the solenoid when the line voltage rejection signal occurs.

13. The protective device of claim 12, wherein the line voltage rejection signal occurs when the voltage across the plurality of line terminals is less than a predetermined undervoltage.

14. The protective device of claim 12 further comprising a microcontroller having an input for sensing the voltage across the plurality of line terminals, the voltage monitoring element being executed by the microcontroller in a set of software instructions.

15. The protective device of claim 14, wherein the reset switch is connected to another input of the microcontroller.

16. The protective device of claim 1 further comprising an indicator that displays when the voltage between the plurality of line terminals is outside a predetermined limit.

17. The protective device of claim 1, wherein the reset button assembly includes an actuator portion disposed inside the housing and the reset prevention mechanism includes a reset barrier portion disposed on the actuator portion, the actuator portion being operatively coupled to the reset switch when the reset button is manually depressed, the actuator portion being prevented by the barrier portion from effecting the reset state when the reset signal is absent.

18. The protective device of claim 17 further comprising a latch mechanism and a test assembly, the circuit interrupter being in the reset state when the latch has engaged the actuator portion, the test assembly including a test button operable via the user accessible surface and a linkage element, the linkage element being configured to disengage the latch from the actuator portion to trip the circuit interrupter when the test button is manually depressed.

19. The protective device of claim 1, wherein the plurality of line terminals includes two phase terminals and a neutral terminal for installation in a split phase electrical power distribution system, the voltage detection element being connected to detect a sum of voltages on the two phase terminals with respect to the neutral terminal, the voltage rejection signal occurring when the sum of voltages with respect to the neutral terminal is greater than the predetermined overvoltage.

20. The protective device of claim 19, further including a voltage monitoring element that provides a trip signal to the switching device to activate the solenoid when the line voltage rejection signal occurs.

\* \* \* \* \*